(12) United States Patent
Brewer (10) Patent No.: US 7,386,042 B1
(45) Date of Patent: Jun. 10, 2008

(54) JITTER MEASUREMENT

(75) Inventor: Symon Reuben Brewer, Plymouth (GB)

(73) Assignee: Wavetek Wandel Golterman Plymouth Ltd., Plymouth (GB)

( * ) Notice: Subject to any disclaimer, the term of this patent is extended or adjusted under 35 U.S.C. 154(b) by 0 days.

(21) Appl. No.: 09/674,444

(22) PCT Filed: Apr. 29, 1999

(86) PCT No.: PCT/GB99/01339

§ 371 (c)(1),
(2), (4) Date: Oct. 15, 2004

(87) PCT Pub. No.: WO99/57842

PCT Pub. Date: Nov. 11, 1999

(30) Foreign Application Priority Data

May 1, 1998 (GB) .................... 9809450.1

(51) Int. Cl.
 *H04B 3/46* (2006.01)
 *H04B 17/00* (2006.01)
(52) U.S. Cl. ........................ 375/226; 375/371
(58) Field of Classification Search ............... 375/226, 375/224, 228, 371; 370/516; 372/395
See application file for complete search history.

(56) References Cited

U.S. PATENT DOCUMENTS

| | | | | |
|---|---|---|---|---|
| 4,105,932 A | * | 8/1978 | Cleary et al. ................ | 315/377 |
| 4,584,695 A | * | 4/1986 | Wong et al. ................ | 375/327 |
| 4,712,223 A | * | 12/1987 | Nelson ........................ | 377/43 |
| 4,974,234 A | * | 11/1990 | Brandt ........................ | 375/226 |
| 4,975,634 A | * | 12/1990 | Shohet ........................ | 324/76.77 |
| 5,003,562 A | * | 3/1991 | van Driest et al. .......... | 375/327 |
| 5,245,637 A | * | 9/1993 | Gersbach et al. ............ | 375/374 |
| 5,430,772 A | * | 7/1995 | Lee et al. .................... | 375/363 |
| 5,440,268 A | * | 8/1995 | Taga et al. .................. | 329/308 |
| 5,481,563 A | * | 1/1996 | Hamre ....................... | 375/226 |
| 5,550,860 A | * | 8/1996 | Georgiou et al. ........... | 375/220 |
| 5,668,830 A | * | 9/1997 | Georgiou et al. ........... | 375/220 |
| 5,742,208 A | * | 4/1998 | Blazo .......................... | 331/23 |
| 5,914,991 A | * | 6/1999 | Gigandet et al. ............ | 375/355 |
| 5,931,891 A | * | 8/1999 | Landry ....................... | 708/271 |

(Continued)

FOREIGN PATENT DOCUMENTS

EP 0 362 491 A2 7/1989

(Continued)

*Primary Examiner*—Chieh M. Fan
*Assistant Examiner*—Freshteh N Aghdam
(74) *Attorney, Agent, or Firm*—Allen, Dyer, Doppelt, Milbrath & Gilchrist, P.A.

(57) ABSTRACT

An apparatus for measuring jitter in a digital signal that includes an offset unit arranged to form an offset reference clock signal, being offset by a predetermined frequency amount from the digital signal. The apparatus also includes a sampler arranged to sample the digital signal at sampling times determined by the offset reference clock signal such that, in the absence of jitter and the offset by a predetermined frequency, there are a predetermined number of sampling times in each bit of the digital signal. The apparatus further includes at least one detector arranged to detect occasions when the number of sampling items in any bit of the digital signal is different from the predetermined number, and a counter arranged to count the occasions over a predetermined time. Also the apparatus includes an analyzer arranged to derive at least one measure of jitter from the counting of the occasions.

18 Claims, 8 Drawing Sheets

U.S. PATENT DOCUMENTS 6,100,724 A * 8/2000 Yoshimura et al. .......... 327/100
6,157,606 A * 12/2000 Inazawa et al. ............. 369/116
6,236,675 B1 * 5/2001 Bedingfield et al. ......... 375/222
6,263,034 B1 * 7/2001 Kanack et al. .............. 375/371

FOREIGN PATENT DOCUMENTS

JP       405102953    *   4/1999   ................. 375/371

* cited by examiner

JITTER MEASUREMENT

BACKGROUND OF THE INVENTION

1. Field of the Invention

The present invention relates to the measurement of jitter in a digital signal. In theory, the spacing of the transitions between levels of a digital signal have a completely uniform spacing. In practice, particularly during transmission, there may be minute variations in the actual time of the transition, relative to the theoretical transition time defined by an absolute reference clock. These variations are referred to as jitter, and may be considered to be a spurious phase modulation of the signal.

2. Summary of the Prior Art

Known systems for measuring jitter involve a very stable phase-locked loop which compares the pulse train containing jitter with an internally generated, jitter-free reference clock. The phase-locked loop has a generator for generating the reference clock, the output of which is fed to the input of a phase demodulator which also receives a digital signal containing jitter. The phase demodulator converts the signal to pulse duration modulation, which is output to a low pass filter, the output of which gives the jitter measurement, and also is fed back to the input of the reference clock generator, to form the loop. The low pass filter has cut off frequency of 5-10% of the bit rate. But since the digital signal being investigated may contain long sequences of digital zeros, a pattern/clock converter may be used to convert the digital signal into a continuous pulse train with the same jitter as the original signal, which pulse train then forms the input to the phase demodulator. Analysis of the output may involve peak value rectification before the results are displayed, and/or analysis with a spectrum analyser.

As mentioned above, such a jitter measurement system involves a low pass filter, and this has a significant influence on the greatest measurable jitter frequency component. The known systems also involve many analog circuits, which are more expensive than digital components.

SUMMARY OF THE INVENTION

Therefore, the present invention seeks to provide a system for measuring jitter in a digital signal, in which a clock signal is extracted from the original digital signal, offset by a predetermined frequency, and smoothed to eliminate jitter therefrom. This gives an offset reference clock signal which is then used to sample the original input signal. Preferably, that offset clock signal is frequency multiplied by an integer factor before it is used for timing the sampling.

The effect of the offset of the reference clock signal is that the sampling point is not fixed relative to the transition point over the bits of the input signal, but instead moves relative thereto. The sampling points are then arranged such that, in the absence of the offset and in the absence of jitter, there is a predetermined number of sampling points (normally only one, but this is not essential) in each successive bit. The present invention then proposes that the occasions when a bit of said digital signal contains other than the predetermined number of sampling points are detected. The occasions when the number of sampling points differs from the predetermined number occur because of the offset of the clock, but also due to jitter when the sampling point approaches the theoretical (absolute) transition point of the bits, being the transition point that would occur in the absence of jitter. The count of the number of occasions a bit has more sampling points than the predetermined number for a suitable measuring duration then gives a measure of the jitter.

Note that a bit may have more samplings than the predetermined number and a later bit may have fewer samplings than the predetermined number and both are occasions to be counted. For simplicity, the number of samplings per bit in the absence of offset and jitter is preferably one. Then, a count is made of the occasions there are either two sampling times within a bit on no sampling times within a bit. It would also be possible to have more than one sampling time within a bit in the absence of offset and jitter, e.g. 2. Then the number of occasions of 3 or 1 sampling times in a bit would be counted.

The measurement period is preferably inversely proportional to the product of the bit rate and the difference between the original frequency and the offset frequency. Where the offset frequency is multiplied by an integer, the measurement period may be divided by that integer.

It is possible for the sampling to be at fixed intervals. However, where the offset clock signal is frequency multiplied by an integer factor, it is preferable that the sampling points are not regularly spaced by that integer factor, but are spaced by factors greater than or less than the integer factor. For example, if the integer is 4, then sampling may be at 3 and 5 intervals of the multiplied offset clock signal.

Thus a count is made of the occasions when there are more or less samplings, within the same bit than the predetermined number and the results of that count may be stored in a table whose size corresponds to the number of samples. The value stored in the table may increment and decrement depending whether the count is above or below the predetermined number. The value stored in the count thus increments and decrements depending on the jitter, with the increments and decrements occurring as the sampling point is close to the absolute transition point of the bits. It is then possible to use the difference between the maximum value counted and the minimum value counted, possibly with 1 subtracted, to be multiplied by the bit period to derived a coarse jitter value. Moreover, if the number of samples between the first occurrence of the maximum value and the last of the occurrence of the minimum value is determined, divided by the total number of samples, a fine jitter value may be determined. The jitter amplitude is then given by the sums of these two values.

It should be noted that where the offset clock is multiplied by an integer value, both of these values may need to be divided by that integer to obtain a jitter value which corresponds to the peak-to-peak value of the deviation of the phase function of the measured signal relative to time. It can also be noted that such a measurement is independent of bit rate, and independent of the shape of the binary signals being measured.

Thus, an aspect of the present invention may provide a system for measuring jitter in a digital signal having means for deriving a first clock signal from the digital signal, the first clock signal being offset by a predetermined frequency from the digital signal and being smoothed, means for sampling the digital signal using the first clock signal, such that, in the absence of jitter and said offset by a predetermined frequency, there are a predetermined number of sampling times in each bit of said digital signal, means for detecting occasions when the number of sampling times in any bit is different from the predetermined number, means for counting such occasions, and means for deriving a measurement of jitter from that count.

Another aspect of the invention relates to a method of measuring jitter using such a system.

The present invention, because it involves digital sampling and counting, can be embodied in a device which makes less use of analog circuits than known jitter measurement systems, which makes embodiments of the invention easier to produce.

BRIEF DESCRIPTION OF THE DRAWINGS

Embodiments of the present invention will now be described in detail, by way of example, with reference to the accompanying drawings, in which.

DETAILED DESCRIPTION

Figure 1:
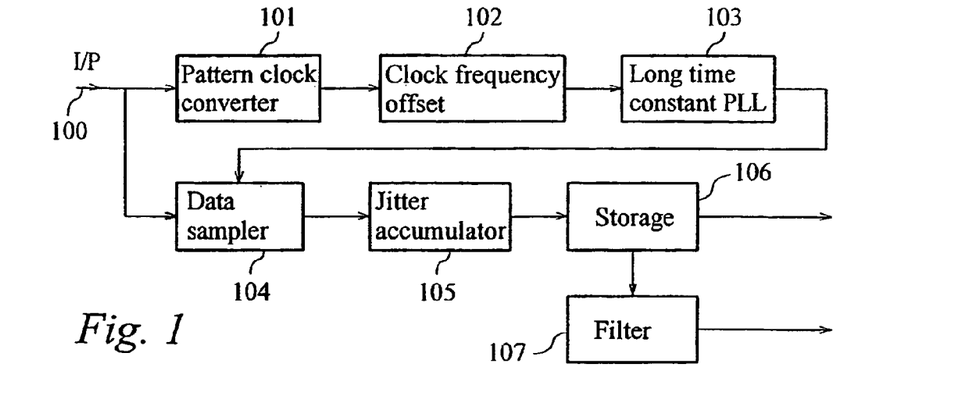
FIG. 1 shows a schematic block diagram of a jitter measurement device being an embodiment of the present invention.

FIG. 1 shows schematically a jitter measurement device according to an embodiment of the present invention. In FIG. 1, a digital pulse train signal which may contain jitter is fed to an input 100, and passed to a pattern clock converter 101. The converter 101 performs a similar function to that in the known systems, in that it converts the digital pulse train received at input 100, which may contain gaps in its pulse-train, into a continuous pulse-train with the same jitter as the original signal. That continuing pulse-train is then passed from the converter 101 to a clock frequency offset circuit 102. The offset circuit 102 determines the frequency of the pulse-train received from the converter 101 using known clock recovery techniques, but then is offset by a frequency which is a small proportion of the frequency of the pulses received.

The offset clock pulses thus generated are passed to a phase locked loop (PLL) 103 with a long time constant. The loop has a phase comparator, a low pass filter and a voltage controlled oscillator, with the low pass filter having a very low cut off frequency it thus separates the relatively weak jitter component from the stronger modulation which is symmetric about the working frequency of the phase comparator. Therefore a slow-acting control voltage is produced which is used to regulate the oscillator to produce an average, constant phase. This generates a jitter-free pulse-train which can thus be used for a reference clock.

In this embodiment, the pulse-train thus generated is frequency multiplied by an integral factor. In the subsequent description, it will be assumed that integer factor is 4, but the embodiment is not limited to this. Thus, the output of the PLL 103 is a reference clock with a frequency multiplied by 4, and offset from the frequency of the digital signal received at the input 100 by a small frequency.

That reference clock is passed to a data sampler 104, and is used to sample the pulse-train received at the input 100. As can be seen from FIG. 1, the pulse-train input at input 100 is passed to the data sampler 104, as well as to the convertor 101. The action of that data sampler 104 will now be described with reference to the flow chart of FIG. 2.

Figure 2:
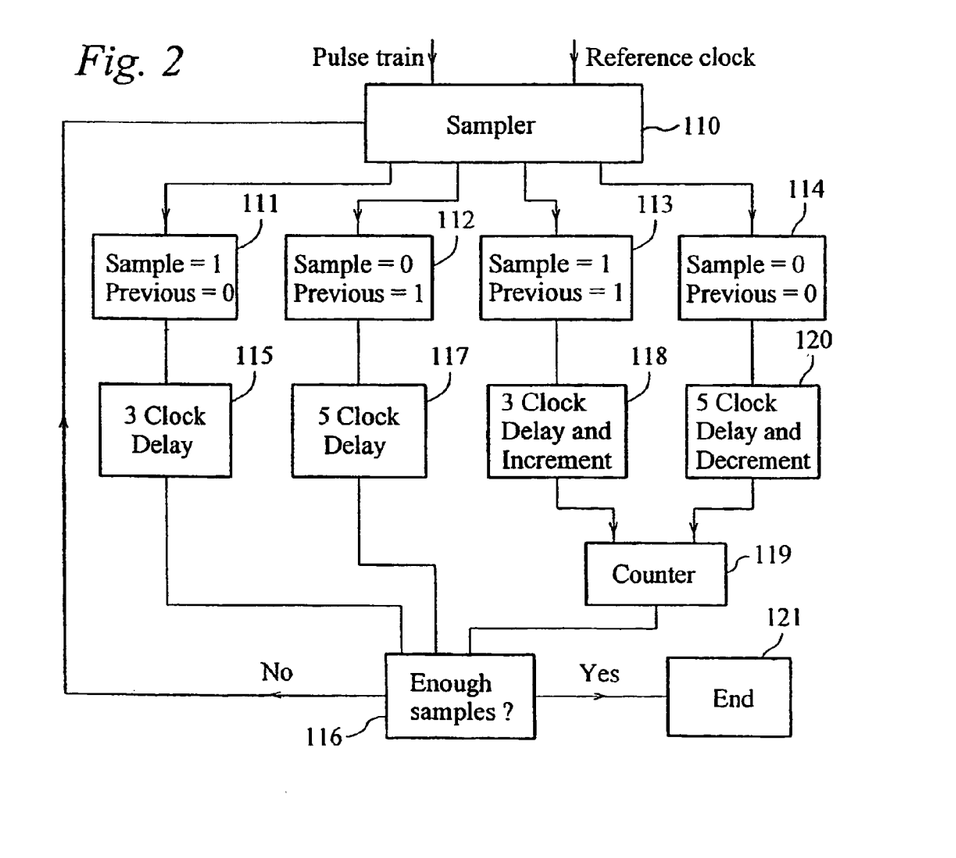
FIG. 2 is a flow-chart of the sampling sequence in the embodiment of FIG. 1.

As can be seen in FIG. 2 a sampling step 110 is carried out, in which the pulse-train received at input 100 is sampled at a time determined by the reference clock signal from PLL 103. The logical level of the sample is then compared with that of the previous sample. There are four possibilities. In two of them, shown at steps 111 and 112, the sample is different from the previous sample, being either a change from logical zero to logical one (step 111) or a change from logical one to logical zero (step 112). In the other two alternatives, the sample is the same as the previous sample. In step 113, both are at logical one, and in step 114 both are at logical zero. From step 111, a three clock delay is imposed at step 115 and, assuming that the sampling operation has not yet been completed (step 116), processing returns to sampling step 110 for another sample. A similar procedure occurs at step 112, except that a five clock delay is imposed at step 117.

If there was no offsetting of the reference clock from the PLL 103, and the pulse-train received at input 100 had no jitter, then the effects of steps 111, 112, 115 and 117 would be for the sampling to switch across the logical transition of the pulse-train. If the sample was at logical level one, but had previously been a logical level zero, corresponding to step 111, the three clock delay would move the sampling point back to logical level zero. Similarly, if the sampling was at logical level zero and the previous sampling at logical level one, the five clock delay 117 would move the sampling point back to logical level one. Thus, without offset and without jitter, the processing would pass alternately via steps 111 and 112.

However, the offset circuit 102 output pulses to the PLL 103 which have an offset frequency relative to the pulse train received at input 100. Thus, and still assuming that there is no jitter in the pulse-train received at input 100, a sampling point which is initially spaced from the transition between logical levels would slowly move towards that transition, and would eventually reach it. As it crossed the transition, two sampling points would occur within the same pulse, and thus the step 113 would be triggered. From step 113, a three clock delay again occurs at step 118, but also a signal is passed to a counter step 119 which increments a counter (not shown in FIG. 2) by one. From counter step 119, processing again passes to the sampling step 110 via step 116. After the sampling point had crossed the transition, it would again return to the options envisaged by steps 111 and 112, the counter step 119 would not again be triggered.

Thus, in the absence of jitter and over a sampling period equal to the inverse of four times the clock offset times the reference clock, counter step 119 would be triggered only once. It can be observed from FIG. 2 that if the movement of the sampling point was within a logical zero, indicated by step 114, a five clock delaying step 120 would be triggered, and the counter step 119 activated to decrement the counter. Thus, in this case, the counter would count down once.

Now consider the effect of jitter in the pulse-train received by sample 100. In the subsequent discussion, the position of the transitions in the pulse-train in the absence of jitter will be called the absolute transition point, to distinguish from the actual transition point. These two transition points differ due to jitter. Whilst the sampling point is remote from the absolute transition point, the processing envisaged by FIG. 2 will pass alternately via steps 111 and 112, assuming that the magnitude of jitter is less than the pulse width of the output of the PLL 103. However, as the sampling point approaches the absolute transition point, due to the offset of the reference clock, there is a possibility that a sampling point will occur within the same pulse as the previous sampling point, due to jitter. At that time, either step 113 or step 114 is triggered, and the counter step 119 either increments or decrements the counter.

Thus, over a part of the total sampling period, the counter step 119 may be triggered several times, depending on the magnitude of the jitter. It is this variation in the counter triggered by counting step 119 which enables jitter to be measured, as will now be described. Due to the jitter, the values stored by the counter triggered by counter step 119 will count up and down as steps 113 and 114 are triggered, if it is possible that the steps 113 and 114 may not be triggered alternately so that the counter step 119 may be triggered by the increment of step 118 more than once, before the counter step 119 is triggered by decrement step 120. It is also possible, of course, for the decrements at step 120 to be triggered more than once. As a result, over a measurement cycle, the counter may count up to a maximum value, and down to a minimum value. This is then used to determine the jitter as will now be described.

Referring again to FIG. 1, the counter step 119 triggers an accumulator 105, which detects the counts and passes them to a store 106 to be stored in a table of a size corresponding to the measurement period. At the end of measurement period, triggered by end step 121, the difference between the maximum counts stored and the minimum counts stored, is determined. If there were no jitter, the minimum count would be zero (or minus one) and the maximum count would be one (or zero). If there is jitter, however, either the maximum count or the minimum count may differ from that. Therefore, 1 is subtracted from the difference between the maximum count and the minimum count and multiplied by a quarter of the bit period of the input pulse-train received at input 100. This one quarter multiple occurs because of the multiplication of the reference clock. This measurement gives a value known as "coarse jitter". Secondly, the count table accumulator 105 is scanned to find the first occurrence at the maximum value count, and the last occurrence at the minimum value count. The difference in position is determined, divided by four and divided by the table size, which is equalled with a number of times the sampler 110 will be triggered during a measurement cycle. This gives a value known as the fine jitter. The sum of the course and fine jitter measurements are the peak-to-peak amplitude of the phase jitter of the input signals.

It can be noted that the term "jitter amplitude" designates the peak-to-peak value of the deviation of the phase function relative to time. The jitter amplitude is measured relative to the length of a clock period, so that it is independent of the shape of the binary signal of the pulse-train. Also, it is independent of bit rate, because it is relative to the clock period, making it a normalised parameter. It is thus possible to use this value to compare jitter amplitudes.

Moreover, and as shown in FIG. 1, the output of the table of store 106 may be passed to additional filter 107, or a discrete Fourier transform carried out on the count values stored. This enables the frequency content of the phase jitter of the input pulse-train received at input 100 to be determined.

In the embodiment described above, the PLL 103 multiplies the offset clock frequency generated by offset circuit 102 by 4. Other factors are useful, but it should be noted that this factor then determines the delays in steps 115, 117, 118 and 120 in FIG. 2, and also the period of time of the measurement before end step 121 is reached. If, for example, a multiplier of 8 was used then steps 115 and 118 may have a seven clock delay, and steps 117 and 120 may have a nine clock delay. Moreover, the measurement period is then equal to the inverse of eight times the bit rate times the clock offset. Finally, when the fine jitter is measured, the subtraction of the table position of the first maximum value count from the table position of the last minimum count would then be divided by eight.

Figure 3A:
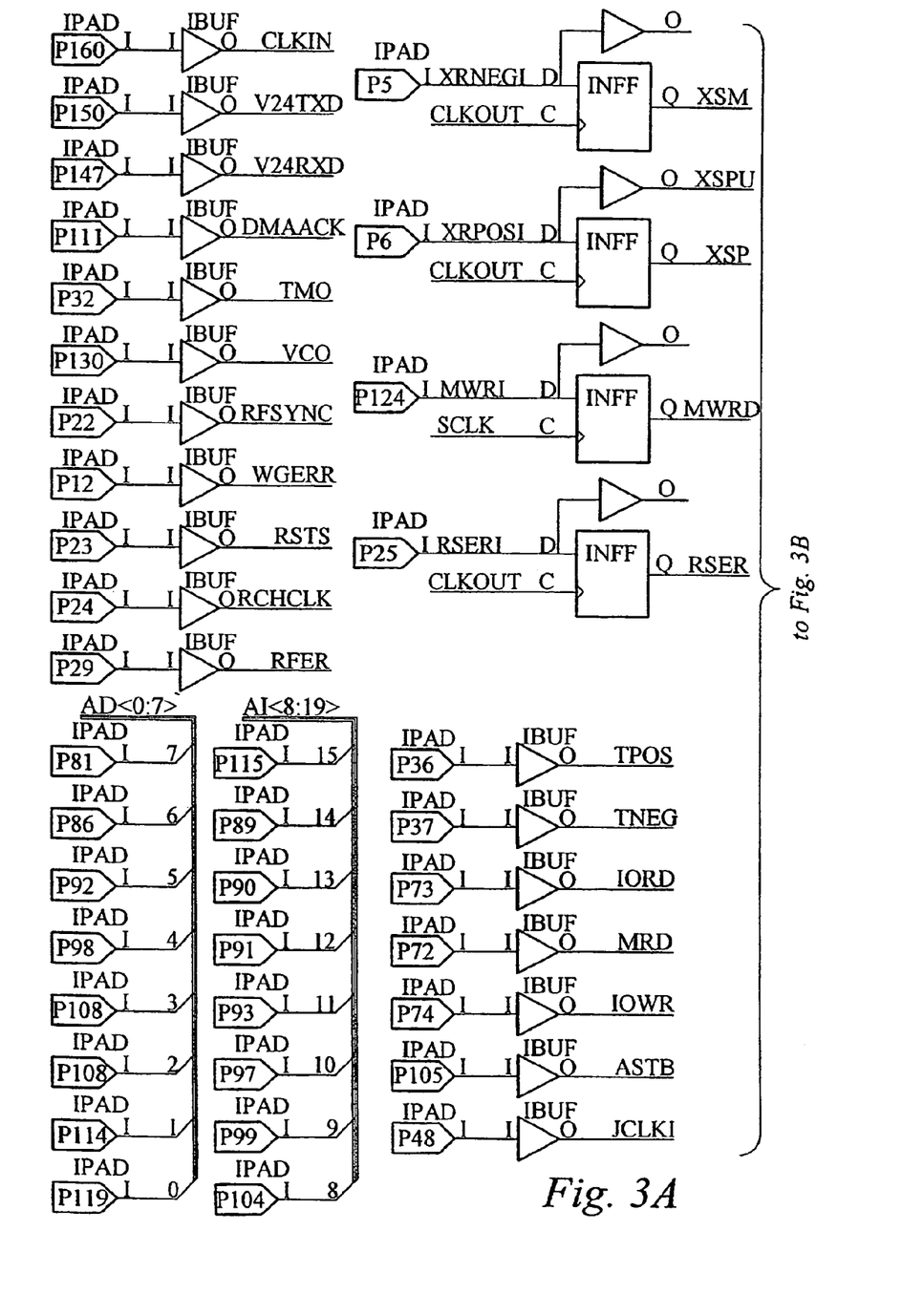
FIG. 3 is a block diagram of components of the jitter measurement device of FIG. 1.
Figure 3B:
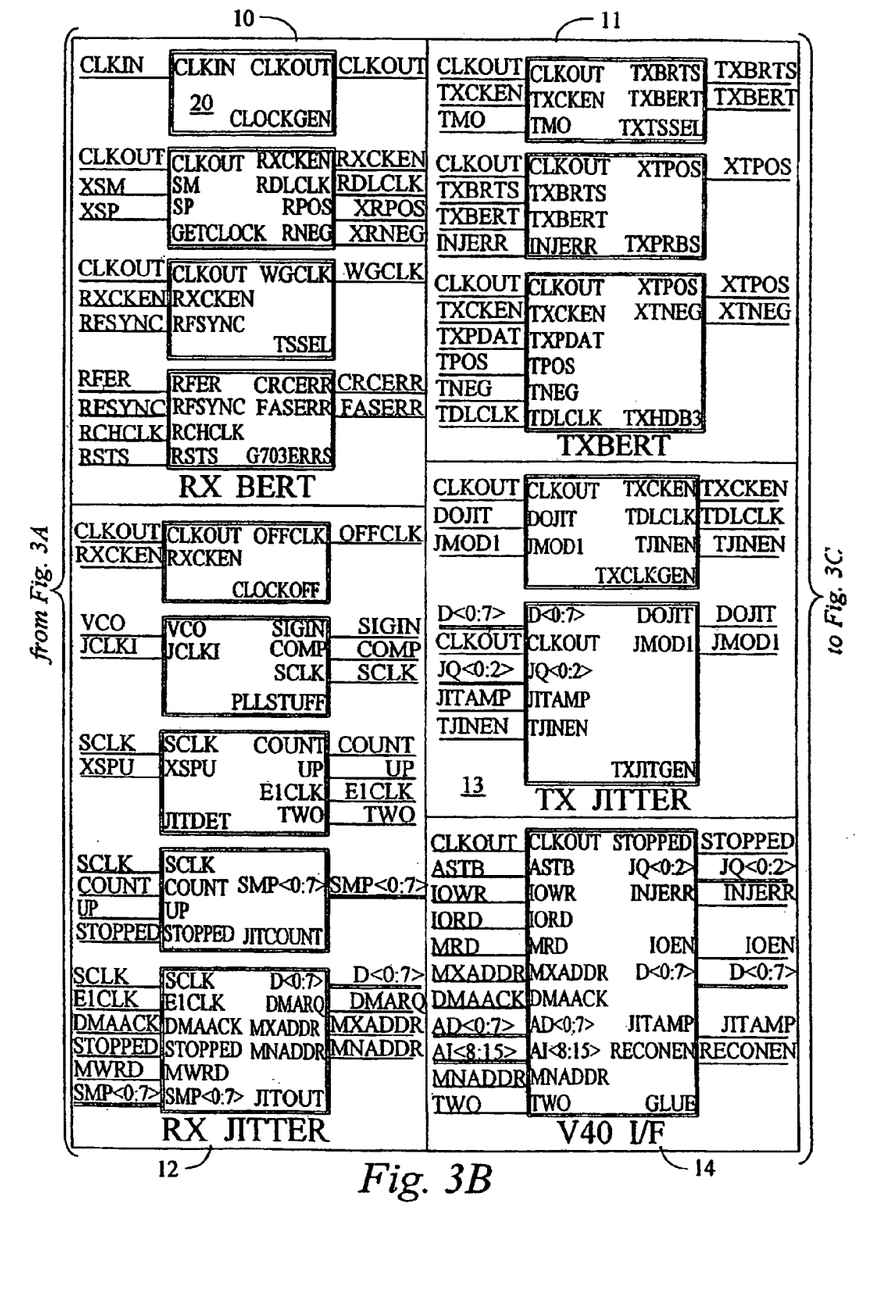
Figure 3C:
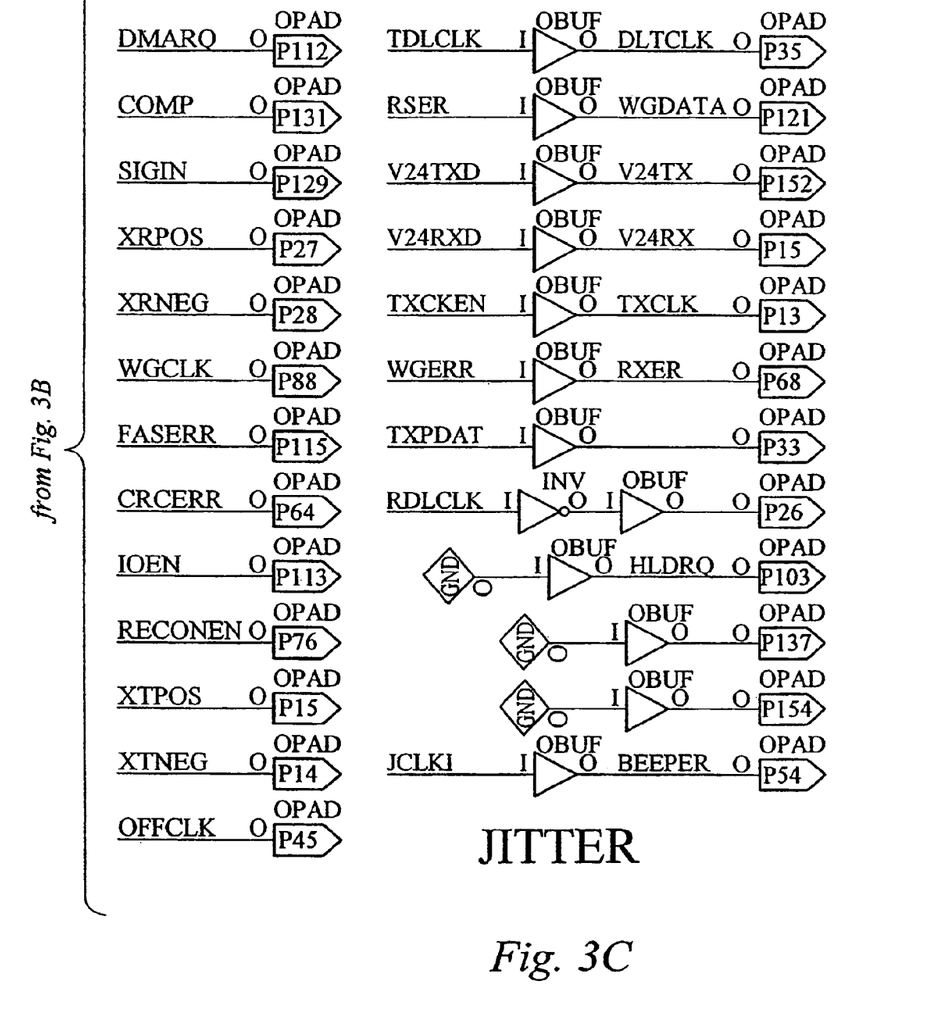

FIG. 3 is the top level functional block diagram for the entire jitter measurement device. It contains five main sections of circuitry, RX bit error rate testing (RX BERT) 10, TX bit error rate testing (TX BERT) 11, RX jitter 12, TX jitter 13 and V40 interfacing circuitry 14. The configuration can generate transmit jitter and also measure the incoming receive jitter while carrying out a bit error rate test at the same time. The V40 circuitry 14 controls operation of the configuration via V40 interface circuitry.

In the device of FIG. 3, the signals considered are shown in Table 1.

TABLE 1

| Signal Name | Description |
| --- | --- |
| AD(0:7) | This signal is the V40's databus and the lower 8 bits of its address bus multiplexed together. Data travels backwards and forwards along this bus between the configuration and the V40. |
| AI(8:15) | This is the top 8 bits of the V40's address bus. It is an input to the configuration and indicates which address the V40 is accessing. |
| ASTB | This is the address/signal from the V40. It is high when the V40 is presenting its address on its external bus. |
| BEEPER | This signal oscillates at 2 megacycles per second and is divided in the smaller xilinx to form the beep signal. |
| CLKIN | This signal comes from the oscillator on the PAX A board and oscillates at 12.298 megahertz. |
| CLKOUT | This signal is derived from signal CLKIN and oscillates at twice the frequency of CLKIN ie at 24.576 megahertz. |
| COMP | This is the comparison output to the phase lock loop. It is used in the generation of the received jitter clock SCLK. |
| COUNT | This signal indicates when a received jitter phase change is to be counted. It is high for phase changes of both plus a quarter of an interval and minus a quarter of an interval. The direction of the COUNT is controlled by the signal UP. |
| CRCERR | This signal pulses whenever received CRC error happens. |
| D(0:7) | This is the internal databus to the configuration. It carries all the data from the V40 to and from the configuration. It also carries the data which is stored in the V40's memory during DMA accesses. |
| DLTCLK | This signal oscillates at the same period as the transmit clock. It is fed to the Dallas chip to provide the transmit clock. It is also used to ensure the signals XTPOS and XTNEG have the right mark space ratio. |
| DMAACK | This signal comes from the V40 and indicates that a DMA cycle is occurring. |
| DMARQ | This signal is generated by the configuration and is used to indicate to the V40 that a DMA request is pending. |
| DOJIT | This signal goes high whenever a twelfth of a unit interval jitter hit is to be inserted into the transmit jitter. The transmit jitter is comprised of a twelfth of a unit interval hits. |
| E1CLK | This signal goes high once per received bit in the RX jitter circuitry. Pulses on the E1CLK are counted and after every 8 counts a jitter result is DMA'd into the V40's memory. |
| FASERR | This signal pulses whenever the receiver detects a FAS error. |
| HLDRQ | This signal is passed to the V40 and is held permanently low in this configuration. |
| INJERR | The V40 controls the signal and can pulse it in order to inject a bit error into the |

TABLE 1-continued

| Signal Name | Description |
|---|---|
| | transmit Bert pattern. |
| IOEN | This signal is used whenever the V40 carries out a IO operation. |
| IORD | This signal goes low whenever the V40 is carrying out a IO read instruction. |
| IOWR | This signal goes low whenever the V40 carries out an IO rate instruction. |
| JCLKI | This signal is sourced from the jitter attenuator chip. It oscillates at the same frequency as the receive clock less $1/(3 \times 2^{18})$ (approximately 1.27 parts per million). This signal is quadruple in frequency to form signal SCLK which is used to sample the received jitter. |
| JITAMP | This signal goes high whenever the V40 is writing to the jitter amplitude register on the transmit jitter circuitry. |
| JMODI | The transmit jitter waveform. It indicates whether the jitter waveform is varying in phase or otherwise. |
| JQ(0:2) | These signals are high whenever the V40 is writing to the transmit jitter frequency registers. |
| MNADDR | This signal is high wherever the received jitter circuitry has taken a jitter sample which is less than or equal to the previous minimum jitter sample. It causes the configuration to latch the DMA address of the next DMA cycle. At the end of the received jitter measurement the V40 reads this address to determine the received jitter. |
| MRD | This signal goes low whenever the V40 executes a memory read instruction. |
| MWRD | This signal goes low whenever the V40 executes a memory write instruction. |
| MWRI | This signal goes low whenever the V40 executes a memory write instruction. |
| MXCADDR | This signal goes high whenever the received jitter measurements is higher than any of the previous received jitter measurements. This signal is used to latch an address which is later used by the V40 to determine the received jitter. |
| OFFCLK | This signal is the received clock offset by $-1/(3 \times 2^{18})$ (approximately -1.27 parts per million). This signal has quarter of a unit interval hits on it and is dejittered using the jitter attenuator chip. |
| RSERI | This is similar to RSER. |
| RSTS | This signal from the Dallas chip goes high during time slot 16 of the E1 frame and is decoded to indicate phase or CRC errors. |
| RXCKEN | This is the received clock enable signal for the RX Bert circuitry. It goes high for one CLKOUT period each received bit. |
| RXER | This signal is the data signal to the WG gate array. |
| RFER | This signal from the Dallas chip is de-coded to indicate FAS or CRC errors. |
| RFSYNC | This signal is used to synchronise the received time slot selection circuitry and also de-coded to indicate phase or CRC errors. |
| RSER | This is the E1 data from the Dallas chip. It is passed to the WG gate ray to measure bit errors. |
| RSTS | This signal from the Dallas chip goes high during time slot 16 of the E1 frame and is |
| RECONEN | This signal is used to reconfigure the xilinx when the jitter test is complete. |
| RCHCLK | This signal from the Dallas chip is the channel clock for the E1 receive frame. It is de-coded to indicate FAS or CRC errors. |
| RDLCLK | This is the receive clock which is passed to the Dallas chip. It is similar to signal RXCKEN but is extended by one clock period to meet the Dallas chip specifications. |
| SCLK | This is the master clock used by the RX |

TABLE 1-continued

| Signal Name | Description |
|---|---|
| | jitter circuitry. It oscillates at normally 8.192 megahertz, minus $1/(3 \times 2^{18})$ (approximately 1.27 parts per million). It is used to sample in incoming received data to detect jitter. |
| SIGIN | This is the signal input to the 4046 phase up loop. It is used to quadruple the signal JCLKI to form signal SCLK. |
| SMP(0:7) | This signal is the raw sample jitter from the received jitter circuitry. |
| STOPPED | This signal is controlled by the V40 and is driven high when the received jitter measurement is stopped. |
| PDLCLK | This signal is the 2 megabit transmit clock generated from the transmit BERT circuitry. transmit jitter circuitry to insert a 12th of a unit interval jitter hit into the transmit clock. This signal prevents jitter hits from being inserted while the transmit bit is marking. This makes sure that the transmitted bits meet the pulse mask. |
| TMO | This signal originates in the Dallas chip and indicates the start of the transmit multiframe. It is used to synchronise the transmit time slot select circuitry. |
| TNEG | This signal originates in the Dallas chip and together with signal TPOS forms the transmit E1 stream. |
| TPOS | This signal originates in the Dallas chip and is used to generate the E1 stream. |
| TWO | This signal goes high when ever the received jitter is too much for the received jitter circuitry to cope with. The V40 can read whether this line as ever been high. If this is the case then the jitter measurement is discarded. |
| TXBERT | This signal goes high during time slots where bit error rate test signals are being transmitted. |
| TXBRTS | This signal goes high whenever a transmitted PRBS bit is to be sent. |
| TXCKEN | This signal goes high for one CLKOUT period each transmit bit. |
| TXCLK | This is the signal pass to the counter timer chip to indicate the transmit bit rate. |
| TSPDAT | This is the transmitted PRBS signal which is injected into the transmit data stream. |
| UP | This signal indicates the polarity of a receive jitter phase change and is used in conjunction with signal COUNT to accumulate the received jitter. |
| V24RX | This signal is the received V24 data which is passed to the V40. |
| V24RXD | This signal is the same as signal V24RX. |
| V24TX | This is the V24 data from the V40 transmitted out of the V24 port. |
| V24TXD | This signal is the same as V24TX. |
| VCO | This signal comes from the 4046 phase lock loop. It is used in the process whereby signal JCLKI is quadruple in frequency to form signal SCLK. |
| WGCLK | This signal is used to clock data into the WG gate array during bit error tests. The WG gate array then measures bit errors. |
| WGDATA | This is the data passed to the WG gate array from the receive BERT circuitry. It is used to perform bit error rate tests on. |
| WGERR | This signal originates in the WG gate array and indicates when a received bit error has occurred. It is passed to a counter timer chip where bit errors are measured. |
| XRNEG | This is the re-timed received E1 data which is passed to the Dallas chip. |
| XPNEGI | This is the raw E1 data from the B board. |
| XRBLS | This is the re-timed received E1 data which is passed to the Dallas chip. |
| XRPOSI | This signal is the raw received E1 data from the B board. |

TABLE 1-continued

| Signal Name | Description |
| --- | --- |
| XSM | This signal is XRNEGI re-timed to the clock CLKOUT. The received clock is recovered from this signal. |
| XSP | This is the signal XRPOSI re-timed to the clock CLKOUT. Along with signal XSM this signal is used to generate the received clock. |
| XSPU | This is the unbuffered received E1 data which is passed to the jitter detection circuitry. Jitter is detected on this signal. |
| XTNEG | This signal is passed to the B board and is used to generate the transmit E1 string. |
| XTPOS | This signal is passed to the B board and is used to generate the transmit E1 string. |

The various components of the system of FIG. 3 will now be considered in more detail. Starting with the RX bit error rate testing circuitry (RX BERT) 10, the detailed structure of this circuitry is shown in more detail in FIG. 4. As can be seen, there are several circuit elements. The first is CLOCK GEN component 20 is used to double the frequency of the signal CLKIN. This forms a higher frequency clock CLKOUT which has a frequency of about 25½ meahertz. The logic for this clock doubling is placed in a CLB map at position AA. This ensures that the logic is very close on the LCA to the global clock buffer GCLK. The circuit works by forming a signal CLKBUF which is identical to the signal CLKIN except delayed by a small amount of time. The clock CLKOUT is passed to a GETCLOCK component 21.

Figure 4:
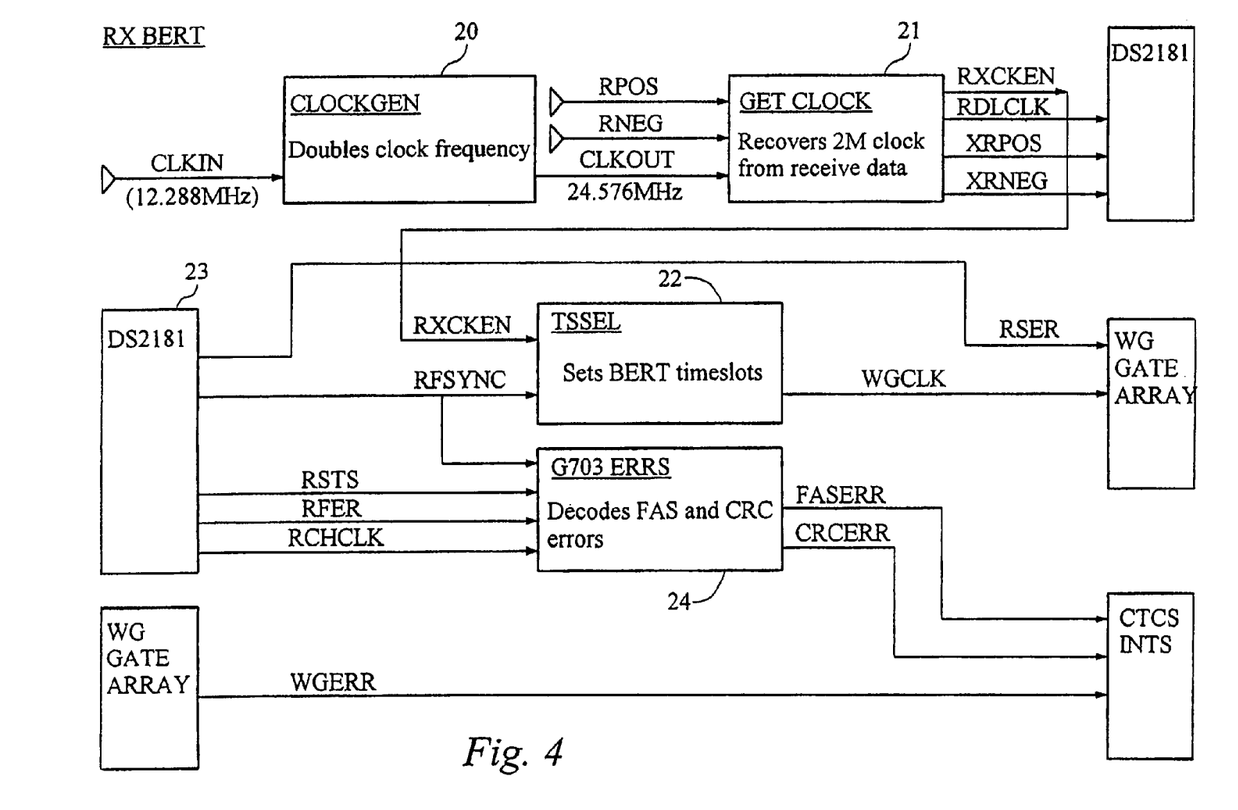
FIG. 4 shows in more detail a part (RXBERT) of the diagram of FIG. 4.

This GETCLOCK component 21 recovers the clock from the received E1 data to be used in the TX Bert circuitry. The raw incoming E1 data is sampled by the system clock CLKOUT and then the positive and negative streams are gated together to form signal RESET. This signal resets a four bit divided by twelve counter. This counter is then used to generate received blocks during times when there are no marks on the received data. CLB map in this drawing is used to try and squash as much logic as possible into the system. Thus, the GETCLOCK component 21 corresponds to the pattern clock converter 101 in FIG. 1.

The signals shown in FIG. 4 are then listed in Table 2.

TABLE 2

| Signal Name | Description |
| --- | --- |
| CLKOUT | This is the 24½ megahertz system clock. |
| CNT0 through to CNT3 | These four signals form a divide by twelve counter. It is divide by twelve as the received bit rate is a twelfth of the system clock. This counter is reset by the signal RESET. This occurs whenever a mark is received on the incoming data. During strings of 0's where there is no timing information on the received E1 data then this counter is used to 1 generate the signal RXCKEN which is the received clock enable. |
| RDLCLK | This signal is generated for the Dallas chip. The signal RXCKEN is only one CLKOUT clock period wide. This is not a wide enough pulse to clock the Dallas chip so the extra signal RDLCLK is generated which is twice as long to clock the Dallas chip. |
| RESET | This signal pulse is high whenever a mark is received on the incoming E1 data and is used to synchronise the received counter. |
| RNEG | This signal is fed to the Dallas chip and is the received negative E1 data. |
| RNEG0 | This is the same signal as RNEG. |
| RPOS | This is the received E1 positive pulses which are fed to |

TABLE 2-continued

| Signal Name | Description |
| --- | --- |
| | the Dallas chip. |
| RPOS0 | This is the same signal as RPOS. |
| RXCKEN | This signal is generated in his block and is the received clock enable. This signal goes high for one CLKOUT period every single received bit. |
| RXP | This signal is used in combination with signal RXCKEN to generate the signal RDLCLK which is used to clock the Dallas chip. |

The component 22 is used to generate the enables for the RX BERT circuitry. A patched signal USERTA goes high whenever the received data is to be passed to the WG gate array for PRBS testing. Two other CLB maps are used simply to compress the logic into the smallest space as possible. The block consists of an 8 bit counter which is formed by signals CNT0 through to CNT7. This counter is reset to 0 by the signal RFSYNC from a Dallas chip 23. This counter is then de-coded to form the time slot select for the received PRBS data. Note that the high ordered 5 bits of the counter from signal CNT3 through to CNT7 are reset by the signal RFSYD. Again this technique is used to try and conserve space. The signal USERTS which is patched is then gated with the received clock enable to form the clock to the WG gate array which is signal WGCLK.

As mentioned above, the TSSEL component 22 receives the signal RFSYNC from the Dallas ship 23. That signal is then passed to a G703ERRS component 24. This component 24 is used to generate the CRC and FAS error signals. These signals are generated from gated signals from the Dallas chip 23. The signal CRC error goes low whenever the signals RF since and RFER are high simultaneously, likewise the signal FASERR goes low whenever the signals RCHCLK and RFER are high while the signal RSTS is low.

Figure 5:
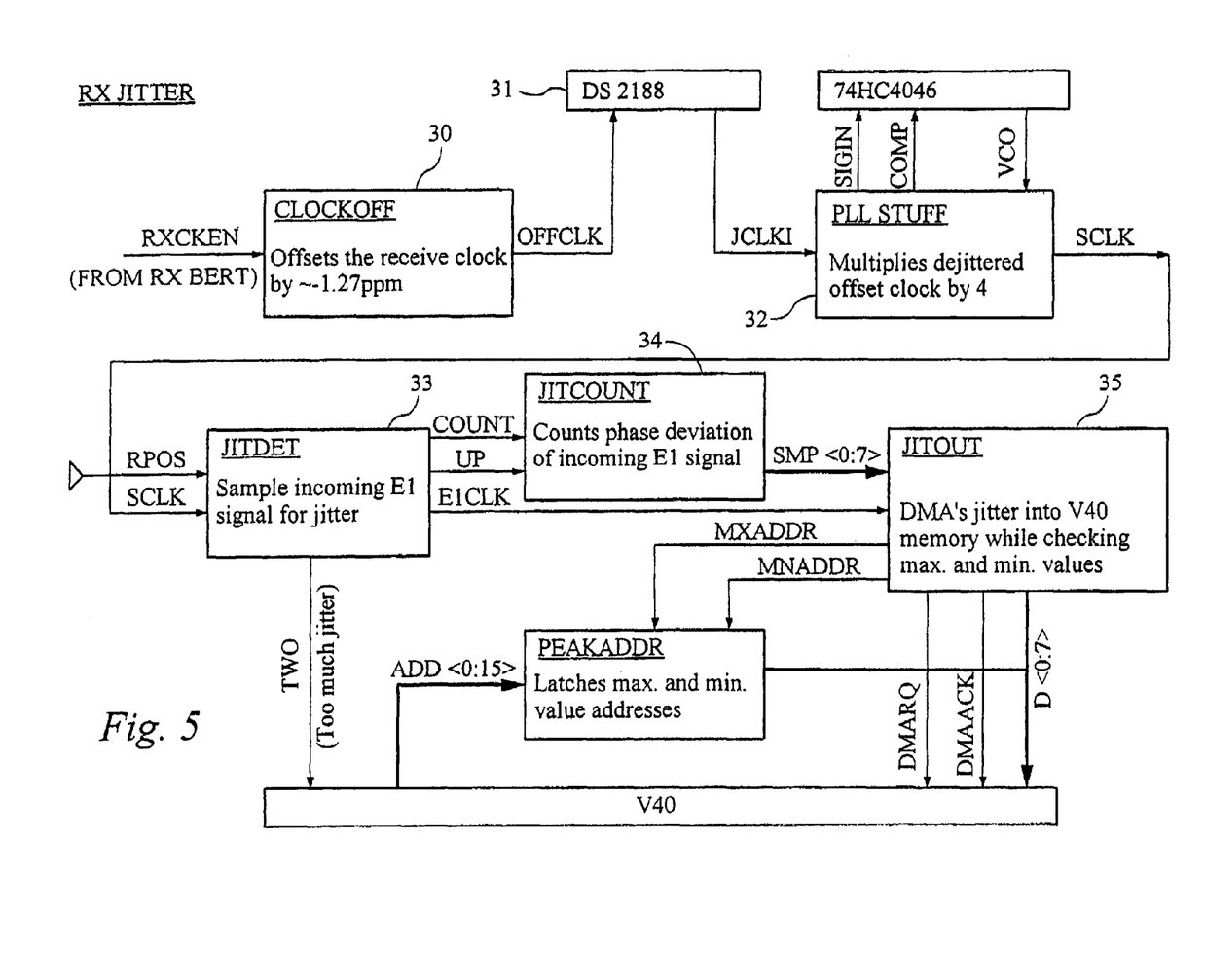
FIG. 5 shows in more detail another part (RXJITTER) of the block diagram of FIG. 3.

Next the RX jitter circuit 12 will be considered in more detail. Its internal structure is shown in FIG. 5. Again, it has several circuit elements. The first is a CLOCKOFF component 30. The component 3Q offsets the incoming received E1 clock by minus $1/(3\times2^{18})$. (approximately 1.27 parts per million) before passing this clock to a Dallas jitter attenuator 31. It has a function which is used to divide the receive clock by 65,536. It also contains test functions and SLPYREG which are used to offset the clock by adding single periods of the clock CLKOUT every 65,536 received bits. Thus, the CLOCKOFF component 30 corresponds to the offset circuit 102 in FIG. 1.

The CLIPYCNT function uses a four bit counter which performs a divide by twelve operation. Bits zero and one divide by three, and bits two and three divide by four, given a total of divide by twelve. The counter clock enabled by signal which goes high for one CLKOUT clock period every 65,536 received bits. The output of the counter is used to determine where in the twelve bit shift register in function SLIPYREG the received clock is inserted. In this way twelfth of a unit interval phase changes are introduced into the received clock in order to offset it by minus 1.27 parts per million. The SLIPYREG function uses a twelve bit shift register. It is used to inject slowly increasing twelfth of a unit interval jitter phase hits into received clock. Every 65,536 the point at which the received clock is injected into the shift register is moved closer to the beginning of the shift register. The output of the shift register ie the offset clock is at the last twelfth tap. When finally the RX clock has been injected into the first bit of the shift register and it is time to access another twelfth of a unit interval phase shift. This received clock is discarded and then the received clock is then injected into the end of the shift register. In this way the clock is offset. The MISSCNT function uses a linear feedback shift register counter. It consists of a sixteen bit shift register, of which four taps are fed back to the input. Other gates are used to detect when the shift register counter has reached its terminal count. This forms signal HIGHNR which is the output.

FIG. 5 shows that the output JCLKI of the Dallas jitter attenuator 31 passes to a PLLSTUFF component 32. This PLLSTUFF component 32 is used to multiply the signal JCLKI by four to form the jitter sample block SCLK. It does this by doubling the frequency using the phase lock loop and then doubling the frequency from the phase up loop by two using an edge detection method. The Dallas jitter attenuator jitter 31 acts a phase lock loop which acts to remove the jitter component from the OFFCLK signal derived from the CLKOFF component 30. This function of the Dallas jitter attenuator 31, together with the PLLSTUFF component 32 thus form the PLL 103 of FIG. 1 which, as previously described, produces a jitter-free pulse-train, and then multiplies that pulse-train by the integer factor of 4.

A JITDET component 33 samples the incoming E1 data and from this measures the received jitter. It also recovers an E1 receive clock from the incoming E1 data stream. Thus, the JITDET component 33 forms the data sampler 104 in FIG. 1. It receives the offset and multiplied clock signal from PLLSTUFF component 32, and also the incoming signal which is being sampled for jitter.

A JITCOUNT component 34 generates the 8 bit jitter sample data. It consists of an 8 bit up/down counter which is enabled by the signal COUNT and the direct of the count is controlled by signal UP. The counter is set to value 80 HEX while the signal STOPPED is high. Notice that signal CNT7 is inverted before emerging from this component 34. Thus the JITCOUNT component 34 forms the accumulator 105.

The output from this JICOUNT component 34 is signal SMP(0:7). That output SMP(0:7) passes to a JITOUT component 35. This component 35 is used to transfer measured jitter into the V40's memory. This memory forms the sampler 106 of FIG. 1. It is also used to detect the amplitude of the received jitter. It does this by storing the addresses of the first time that a maximum valued jitter sample was stored and also the address of where the last minimum value jitter sample was stored. The difference between these addresses ratio to the size of the whole DMA buffer gives an indication of the jitter amplitude. The current value of the sample jitter is stored in a shift register, along with the maximum value recorded up until now and the minimum value recorded up until now. These are compared in a block called compare which indicates when bigger or smaller samples are received. These signals are processed to generate latches for addresses.

Figure 6:
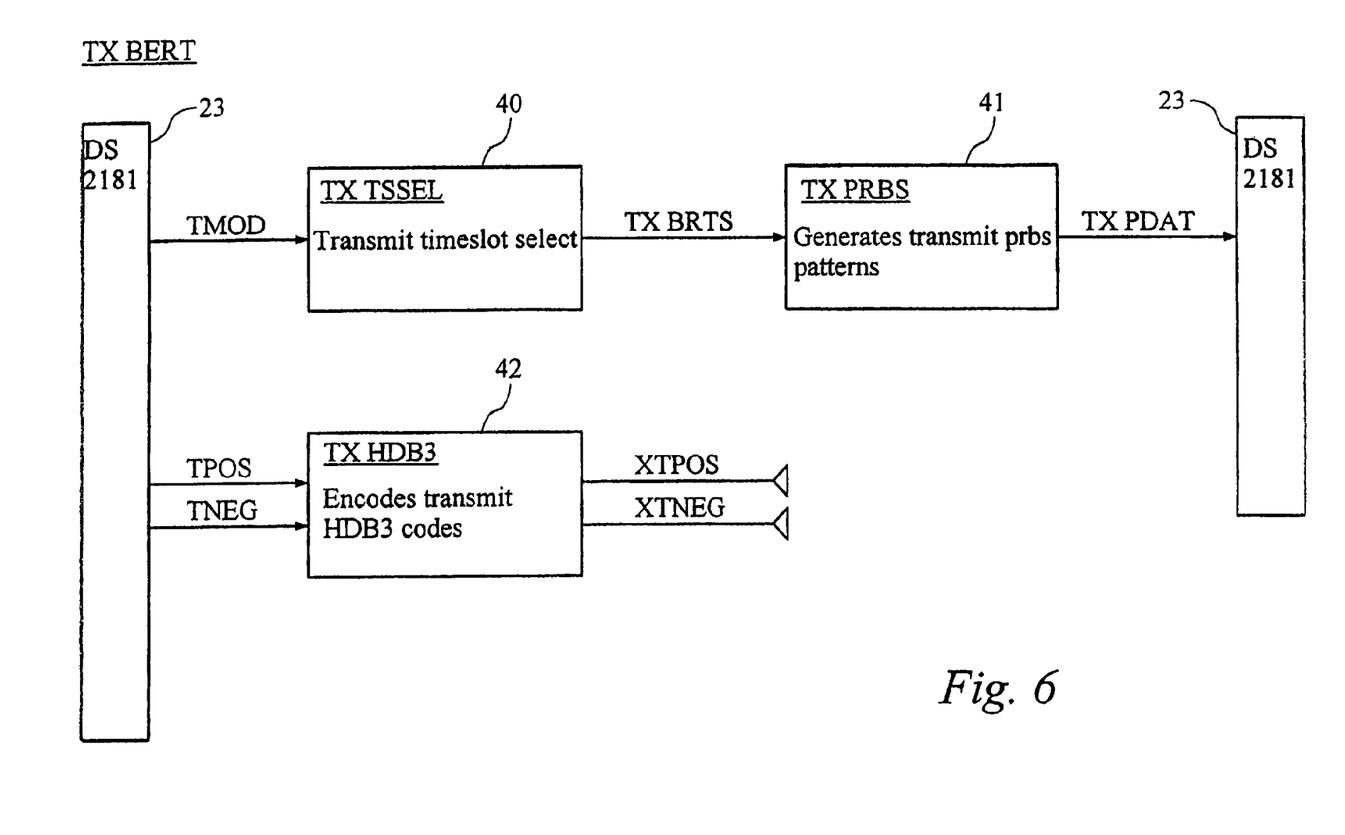
FIG. 6 shows in more detail yet another part (TXBERT) of the block diagram of FIG. 3

Next the TXBERT circuit 11 will be considered in more detail with reference to FIG. 6. The TXBERT circuit 11 has a TXTSSEL component 40. The component 40 is used to generate the transmit enables for the transmit Bert data. It consists of an 8 bit counter formed by the signals CNT0 through to CNT7. This counter is reset by the signal TMO which indicates the start of the transmit multiframe. The signal TMO comes from the Dallas chip 23. It is latched and gated to form signal TS since which directly resets the counter. The output of this counter is then decoded to form a signal TXBERT. This signal goes high during which data is to be transmitted. In unframed mode this signal is patched permanently high. The signal is patched in the CLBTX time slot select. Note that signal TFSYNC directly resets the high five bits of the eight bit counter whereas the low three bits of the counter are set to the value 001 by this signal. This ensures everything lines up with the timing of the TMO signal.

The output TXBERTS of the TXTSSEL component 41 passes to a TXPRBS component 41. This component 41 is used to generate the transmit PRBS Bert pattern. It consists of a 15 bit shift register formed by signals TAP0 through to TAP14. Various outputs from this shift register are then gated together and fed back to the input of shift register to generate a PRBS pattern. The CLBTXPRBS select is patched to select which taps are enabled. The CLB map TX polarity select is patched to determine the polarity of the transmitted PRBS data. Signal INJER is controlled by the V40 14. When this signal toggles high during the transmission of Bert data a bit error is injected into the transmitted data stream. This bit error signal is decoded to signal BERR which inverts the output of the PRBS shift register. Note the output of the shift register occurs from the eighth tap signal TAP7 although it could have come from any of the other taps if desired.

The TXJITTER circuit 13 will now be described with reference to FIG. 7. It has a TXCKEN component 50. This component 50 is used to generate the transmit clock. The transmit clock can be jittered under the influence of signals DOJIT and JMOD1. When signal DOJIT is high a twelfth of a unit interval phase hit is introduced into the transmit click if a polarity depending the state of signal JMOD1. These phase hit insertion happen during the time when the line is not marking except in high jitter situations.

Figure 7:
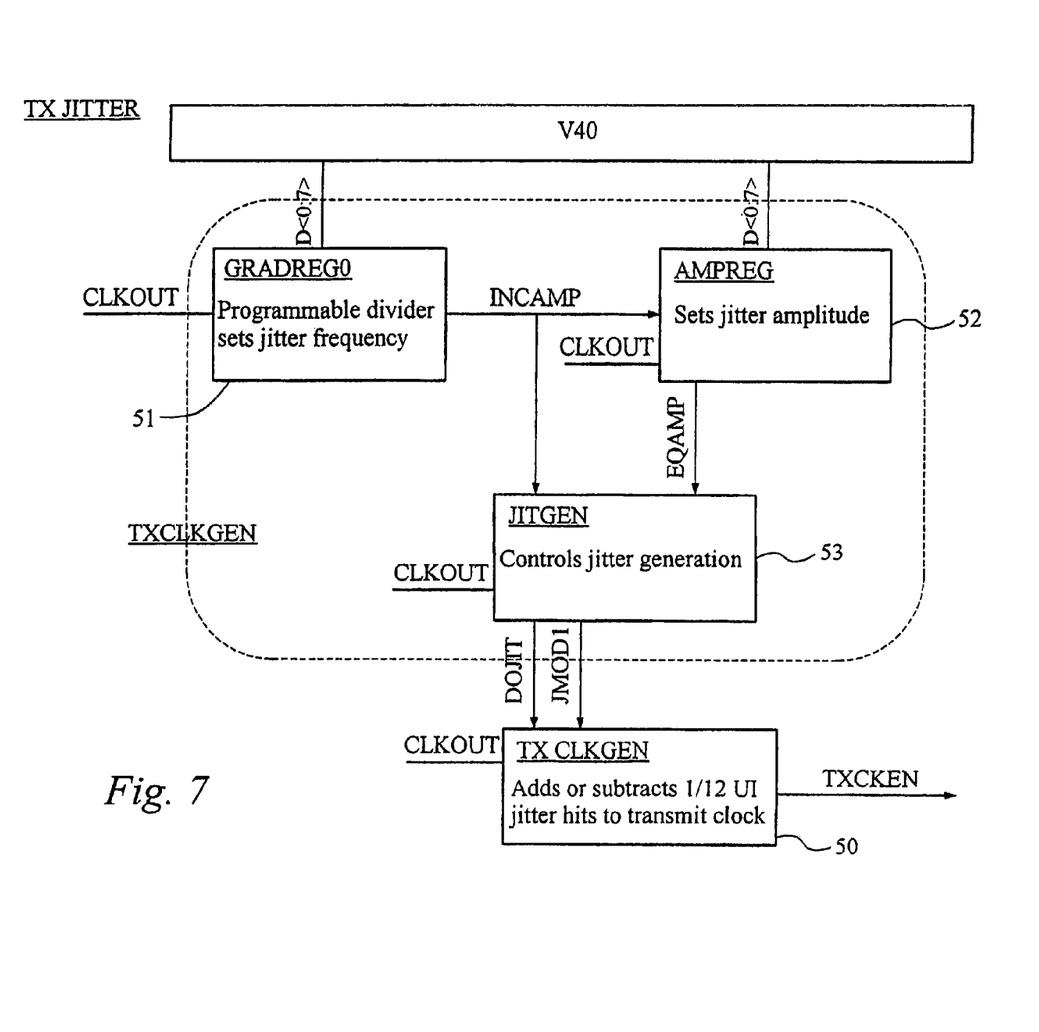
FIG. 7 shows in more detail yet another part (TXJITTER) of the block diagram of FIG. 3.

FIG. 7 also shows a TXHDB3 component 42. This component 42 is used to encode the transmit data in a HDB3 format. Note it can be patched so that the transmit data is AMI. The configuration must do this encoding as the Dallas chip 23 can only encode for HDB3 during unframed transmission when the HDB3 coding is needed. For this reason the Dallas transmitter is always used to transmit AMI data. The CLB maps TX line code and TX framing are patched to enable AMI mode. In this mode, no extra violations are inserted into the transmit data.

FIG. 7 also shows a GRADREGO component 51. This component 51 contains the circuitry which is used to set the frequency of the transmitted jitter. It consists of a nineteen bit counter which is formed by signals JCNT(0:19) together with registers which are used to compare against this count value. The output INCAMP indicates when it is time to inject a twelfth of a unit jitter hit into the transmitted jitter waveform. The block EXTRACLK also enables fine tuning of the jitter frequency. The output INCAMP of the component 51 passes to an AMPREG component 52.

The component 51 is used to set the amplitude of the transmitted jitter. It consists of an eight bit latch which the V40 14 can write to and an eight bit counter which is compared to the contents of this latch to indicate when the required jitter amplitude has been reached.

The INCAMP signal also passes to a JITGEN component 57. This component is used to control the generation of transmit jitter in the TX jitter generation circuitry.

It can be seen from the above discussion of FIGS. 3 to 7 that the embodiment of FIG. 1 makes use primarily of digital components. This makes embodiments of the present invention easier and cheaper to produce. In the embodiment of FIG. 1, the PLL circuit 103 needs to be an analog circuit, but the fact that the PLL circuit 103 has a low time constant means that it is easy to produce and is thus inexpensive.

In the above discussion, it is assumed that the pulse-train received at input 100 is a co-directional digital data signal, in which the clock information and data are included together in one signal. The present invention may also be applied to clock signals which are not included with data, clocks still being recovered in the same way as discussed above. Moreover, the present invention may be used to investigate the jitter of an analog signal, by converting that to a digital signal before being input to input 100.

The invention claimed is:

1. A method of measuring jitter in a digital signal comprising:
   forming a jitter-free offset reference clock signal from said digital signal being offset by a predetermined frequency amount from said digital signal, wherein the jitter-free offset reference clock signal moves relative to a transition point for bits of the digital signal;
   sampling said digital signal with only a reference clock signal at sampling times determined by an integer multiple of the frequency of said jitter-free offset reference clock signal, such that, in the absence of jitter and said offset by a predetermined frequency, there are a predetermined number of sampling times in each bit of said digital signal;
   detecting occasions when the number of sampling times in any bit of said digital signal is different from said predetermined number;
   counting said occasions over a predetermined time, and deriving at least one measure of jitter from said counting of said occasions;
   wherein one of said at least one measure of jitter is obtained by counting up one value for each of said occasions representing sampling times greater than the predetermined number within a bit to a maximum value, counting down one value for each of said occasions representing sampling times less than the predetermined number within a bit to a minimum value and determining a difference between the maximum count value and the minimum count value.

2. A method according to claim 1, wherein said jitter-free offset reference clock signal is formed by extracting a clock signal from said digital signal and offsetting said clock signal by said predetermined frequency.

3. A method according to claim 2, further including smoothing said jitter-free offset reference clock signal.

4. A method according to claim 1, wherein said sampling times are at clock bit intervals being plus and minus one of said integer multiple.

5. A method according to claim 1, wherein the predetermined time is inversely proportional to the product of the bit rate of the digital signal and the predetermined frequency amount.

6. A method of measuring jitter in a digital signal comprising:
   forming a jitter-free offset reference clock signal from said digital signal being offset by a predetermined frequency amount from said digital signal, wherein the jitter-free offset reference clock signal moves relative to a transition point for bits of the digital signal;
   sampling said digital signal with only a reference clock signal at sampling times determined by an integer multiple of the frequency of said jitter-free offset reference clock signal, such that, in the absence of jitter and said offset by a predetermined frequency, there are a predetermined number of sampling times in each bit of said digital signal;
   detecting occasions when the number of sampling times in any bit of said digital signal is different from said predetermined number;
   counting said occasions over a predetermined time, and deriving at least one measure of jitter from said counting of said occasions;
   wherein one of said at least one measure of jitter is obtained by counting up one value for each of said occasions representing sampling times greater than the predetermined number within a bit to a maximum value, counting down one value for each of said occasions representing sampling times less than the predetermined number within a bit to a minimum value and determining a time difference between the first occasion of the maximum count value and the last occasion of the minimum count value.

7. A method according to claim 6, wherein the time difference is divided by said integer multiple and said predetermined time.

8. An apparatus for measuring jitter in a digital signal comprising:
   means for forming a jitter-free offset reference clock signal from said digital signal, which clock signal is offset by a predetermined frequency amount from said digital signal, wherein the jitter-free offset reference clock signal moves relative to a transition point for bits of the digital signal;
   means for sampling said digital signal only with a reference clock signal at sampling times determined by said jitter-free offset reference clock signal, such that, in the absence of jitter and said offset by a predetermined frequency, there are a predetermined number of sampling times in each bit of said digital signal;
   means for detecting occasions when the number of sampling times in any bit of said digital signal is different from said predetermined number; and
   means for counting said occasions over a predetermined time, and
   means for deriving at least one measure of jitter from said means for counting of said occasions, said deriving means comprising means for counting up one value for each of said occasions representing sampling times greater than the predetermined number within a bit to a maximum value and for counting down one value for each of said occasions representing sampling times less than the predetermined number within a bit to a minimum value and means for determining a time difference between the first occasions of the maximum count value and the last occasion of the minimum count value.

9. An apparatus according to claim 8, wherein said means for forming said offset reference clock signal comprises means for extracting a clock signal from said digital signal and means for offsetting the clock signal by said predetermined frequency.

10. An apparatus according to claim 9, wherein said means for forming said offset reference clock signal includes means for smoothing said offset reference clock signal.

11. An apparatus for measuring jitter in a digital signal comprising:
    an offset unit arranged to form a jitter-free offset reference clock signal from said digital signal, being offset by a predetermined frequency amount from said digital signal, wherein the jitter-free offset reference clock signal moves relative to a transition point for bits of the digital signal;
    a sampler arranged to sample said digital signal with only a reference clock signal at sampling times determined by said jitter-free offset reference clock signal such that, in the absence of jitter and said offset by a predetermined frequency, there are a predetermined number of sampling times in each bit of said digital signal;

at least one detector arranged to detect occasions when the number of sampling items in any bit of said digital signal is different from said predetermined number;

a counter arranged to count said occasions over a predetermined time, wherein the predetermined time is inversely proportional to the product of the bit rate of the digital signal and the predetermined frequency amount, and an analyzer arranged to derive at least one measure of jitter from said counting of said occasions;

wherein one of said at least one measure of jitter is obtained by counting up one value for each of said occasions representing sampling times greater than the predetermined number within a bit to a maximum value, counting down one value for each of said occasions representing sampling times less than the predetermined number within a bit to a minimum value and determining a difference between the maximum count value and the minimum count value.

12. The apparatus according to claim 8, wherein said sampling times are determined by an integer multiple of the frequency of said offset reference clock signal.

13. The apparatus of claim 11, wherein the offset reference clock signal is formed by extracting a clock signal from said digital signal and offsetting said clock signal by said predetermined frequency.

14. The apparatus of claim 13, further including smoothing said offset reference clock signal.

15. The apparatus of claim 11, wherein said sampling times are determined by an integer multiple of the frequency of said offset reference clock signal.

16. The apparatus of claim 15, wherein said sampling the times are at clock bit intervals being plus and minus one of said integer multiple.

17. An apparatus for measuring jitter in a digital signal comprising:

an offset unit arranged to form a jitter-free offset reference clock signal from said digital signal, being offset by a predetermined frequency amount from said digital signal, wherein the jitter-free offset reference clock signal moves relative to a transition point for bits of the digital signal;

a sampler arranged to sample said digital signal with only a reference clock signal at sampling times determined by said jitter-free offset reference clock signal such that, in the absence of jitter and said offset by a predetermined frequency, there are a predetermined number of sampling times in each bit of said digital signal;

at least one detector arranged to detect occasions when the number of sampling items in any bit of said digital signal is different from said predetermined number;

a counter arranged to count said occasions over a predetermined time, wherein the predetermined time is inversely proportional to the product of the bit rate of the digital signal and the predetermined frequency amount, and an analyzer arranged to derive at least one measure of jitter from said counting of said occasions;

wherein one of said at least one measure of jitter is obtained by counting up one value for each of said occasions representing sampling times greater than the predetermined number within a bit to a maximum value, counting down one value for each of said occasions representing sampling times less than the predetermined number within a bit to a minimum value and determining a time difference between the first occasion of the maximum count value and the last occasion of the minimum count value.

18. The apparatus according to claim 17, wherein the time difference is divided by said integer multiple and said predetermined time.

* * * * *